(12) United States Patent
Burkholder

(10) Patent No.: US 6,975,369 B1
(45) Date of Patent: Dec. 13, 2005

(54) LIQUID CRYSTAL DISPLAY WITH COLOR BACKLIGHTING EMPLOYING LIGHT EMITTING DIODES

(75) Inventor: Greg Eugene Burkholder, Valley View, OH (US)

(73) Assignee: GELcore, LLC, Valley View, OH (US)

( * ) Notice: Subject to any disclaimer, the term of this patent is extended or adjusted under 35 U.S.C. 154(b) by 22 days.

(21) Appl. No.: 10/248,037

(22) Filed: Dec. 12, 2002

(51) Int. Cl.[7] ............................................ G02F 1/1335
(52) U.S. Cl. ...................................................... 349/61
(58) Field of Search ................. 349/61–71; 345/88–89

(56) References Cited

U.S. PATENT DOCUMENTS

| | | | |
|---|---|---|---|
| 6,115,016 A * | 9/2000 | Yoshihara et al. ............. 345/88 |
| 6,330,100 B2 | 12/2001 | Van Aerle et al. ........... 359/254 |
| 6,570,554 B1 * | 5/2003 | Makino et al. ............. 345/102 |
| 6,697,042 B1 * | 2/2004 | Cohen et al. ................ 345/102 |
| 2001/0035853 A1 | 11/2001 | Hoelen et al. ............... 345/102 |
| 2001/0038532 A1 | 11/2001 | Harbers et al. ................ 362/31 |
| 2001/0046131 A1 | 11/2001 | Hoelen et al. .............. 362/231 |
| 2002/0006044 A1 | 1/2002 | Harbers et al. ............. 362/555 |
| 2002/0070914 A1 * | 6/2002 | Bruning et al. ............. 345/102 |

\* cited by examiner

*Primary Examiner*—Dung Nguyen
(74) *Attorney, Agent, or Firm*—Fay, Sharpe, Fagan, Minnich & McKee, LLP

(57) ABSTRACT

A color display device (210, 310, 410) includes a backlight (214, 414) that cyclically emits first, second, and third component color backlighting in turn over a cycle period. The cycle period repeats at a cycling frequency (f) that exceeds a maximum human visual response frequency. A liquid crystal display (LCD) (112, 312, 412) generates a first display during the first component color backlighting, a second display during the second component color backlighting, and a third display during the third component color backlighting.

7 Claims, 6 Drawing Sheets

LIQUID CRYSTAL DISPLAY WITH COLOR BACKLIGHTING EMPLOYING LIGHT EMITTING DIODES

BACKGROUND OF INVENTION

The following relates to the lighting and display arts. It especially relates to active matrix liquid crystal display (LCD) devices, and will be described with particular reference thereto. However, it will also find application in other types of LCD displays, and in other types of backlit display devices.

With reference to FIG. 1, a conventional flat screen display 10 includes an active matrix liquid crystal display (LCD) 12 and a backlight 14. The LCD 12 includes a matrix of thin film transistors (TFTs) 16 fabricated on a substrate 18 of glass or another transparent material. A liquid crystal film 20 is disposed over the substrate 18 and the TFTs 16. Addressing of the TFTs 16 by gate lines (not shown) deposited on the substrate 18 during TFT fabrication cause selected TFTs 16 to conduct electrical current and charge the liquid crystal film 20 in the vicinity of the selected TFTs 16. Charging of the liquid crystal film 20 alters the opacity of the film, and effects a local change in light transmission of the liquid crystal film 20. Hence, the TFTs 16 define display cells or pixels 22 in the liquid crystal film 20. Typically, the opacity of each pixel 22 is charged to one of several discrete opacity levels to implement an intensity gray scale, and so the pixel 22 is a gray scale pixel. However, pixel opacity also can be controlled in a continuous analog fashion or a digital (on/off) fashion.

A color-selective filter 26, 28, 30 is disposed over each pixel 22. Specifically, first color filters 26 of a first color component, second color filters 28 of a second color component, and third color filters 30 of a third color component are distributed on pixels 22 across the display area of the LCD 12 to produce a color display. Typically, the first, second, and third colors include red, green, and blue primary colors to produce a red-green-blue (RGB). Preferably, a top matrix 32 of opaque lines separating pixels 22 is arranged between the color filters 26, 28, 30 to improve visual contrast. Specifically, FIG. 1 shows a single color or RGB pixel that includes a first component color (e.g., red output by the pixel 22 covered by the filter 26), a second component color (e.g., green output by the pixel 22 covered by the filter 28), and a third component color (e.g., blue output by the pixel 22 covered by the filter 30) that are selectively combined or blended to generate a selected color.

In operation, the backlight 14, which includes a white compact fluorescent lamp (CFL), an array of white light emitting diodes (LEDs), or other white light source 34, produces a substantially uniform white planar illumination directed toward the LCD 12. A polarizer 36 of the LCD 12 disposed on a backside of the substrate 18 optimizes the light polarization with respect to polarization properties of the liquid crystal film 20. The opacity of the pixels 22 is modulated using the TFTs 16 as discussed previously to create a transmitted light intensity modulation across the area of the display 10. The color filters 26, 28, 30 colorize the intensity-modulated light emitted by the pixels to produce a color output. By selective opacity modulation of neighboring pixels 22 of the three color components, selected intensities of the three component colors (e.g., RGB) are blended together to selectively control color light output. The pixels 22 of a particular color or RGB pixel such as that shown in FIG. 1 are blended. As is known in the art, selective blending of three primary colors such as red, green, and blue can generally produce a full range of colors suitable for color display purposes. Spatial dithering is optionally used to provide further color blending across neighboring color pixels.

Conventional flat screen displays such as the exemplary display 10 suffer certain disadvantages. The light output efficiency is poor due to light absorption within the LCD 12. Typically, the polarizer 36 reduces the light intensity by about 50%. The TFTs 16 produce further shadow losses of a magnitude dependent upon the TFT device area. Typical losses due to TFT shadowing in present active matrix liquid crystal displays are about 115%. The color filters 26, 28, 30 each substantially absorb two of the three color components to produce a pure third color component output, and hence have transmissivities no higher than about 30%. Combining these losses, the light output efficiency for the LCD 12 is about 5%.

Another disadvantage of conventional LCD-based flat screen displays is manufacturing complexity. In particular, for each gray scale pixel 22 one of the color filters 26, 28, 30 is precisely aligned and bonded. Precision in the filter alignment is critical since misalignment can create gaps through which white light can pass. This alignment process is time-consuming and error-prone.

Yet another disadvantage of conventional LCD-based flat screen displays is a relatively large color (RGB) pixel size since each color pixel is comprised of at least three component gray scale pixels 22. In some arrangements, a second green pixel is included to compensate for visual color sensitivity differences, leading to a still larger color pixel size. Increased color pixel size corresponds to reduced display resolution.

The following contemplates an improved apparatus and method that overcomes the above-mentioned limitations and others.

SUMMARY OF INVENTION

According to one aspect, a color display device is disclosed. A backlight cyclically emits at least first, second, and third component color backlighting in turn over a cycle period. The cycle period repeats at a cycling frequency that exceeds a maximum human visual response frequency. A liquid crystal display (LCD) generates a first display during the first component color backlighting, a second display during the second component color backlighting, and a third display during the third component color backlighting.

According to another aspect, a color display is disclosed. A backlight includes an array of backlight elements that produce backlight illumination. Each backlight element includes a plurality of lamps each of which emit illumination of a selected component color when energized. The backlight further includes backlight circuitry communicating with the backlight elements for energizing the plurality of lamps. A liquid crystal film is arranged to receive the backlight illumination. An array of liquid crystal control elements operatively define liquid crystal cells. Each liquid crystal control element is selectively operated to control transmission of the illumination through the liquid crystal cell. The liquid crystal control elements cooperatively produce a color display that selectively blends the selected component colors.

According to another aspect, a display method is provided. A liquid crystal display is configured with a first light transmission pattern. A first illumination of a first color is generated. The first illumination is transmitted through the liquid crystal display configured with the first light transmission pattern. The configuring, generating, and transmitting are repeated for at least two other colors. The above operations are repeated to produce an updateable display.

According to another aspect, a color display device is disclosed, including a light-transmissive liquid crystal display (LCD). A backlight is arranged to illuminate the light-transmissive LCD. The backlight includes at least first color component light emitting diodes (first color component LEDs), second color component light emitting diodes (second color component LEDs), and third color component light emitting diodes (third color component LEDs). LED circuitry cyclically alternates between powering the first color component LEDs to produce first color component backlighting, powering the second color component LEDs to produce second color component backlighting, and powering the third color component LEDs to produce third color component backlighting. LCD circuitry updates a display shown on the LCD. The updates of the LCD are synchronized with color changes of the backlight.

According to yet another aspect, a color display device is disclosed. A backlight emits illumination with a selected temporal sequence of color components. A light-transmissive backlit display includes light-transmissive pixels distributed over a display area. The light-transmissive pixels are backlit by the backlight. The pixels have controlled opacity that is updated synchronously with the selected sequence of color components to effect full-color pixels.

According to still yet another aspect, a color display device is disclosed. A planar light transmissive display includes an array of light-transmissive pixels each having selectable opacity. A backlight includes backlight elements. Each backlight element includes a plurality of light sources. Each light source emits light of a selected color component that is coupled to a selected one pixel. The plurality of light sources and the coupled pixels define a color picture element.

Numerous advantages and benefits of the present invention will become apparent to those of ordinary skill in the art upon reading and understanding the following detailed description.

BRIEF DESCRIPTION OF DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION

Figure 2:
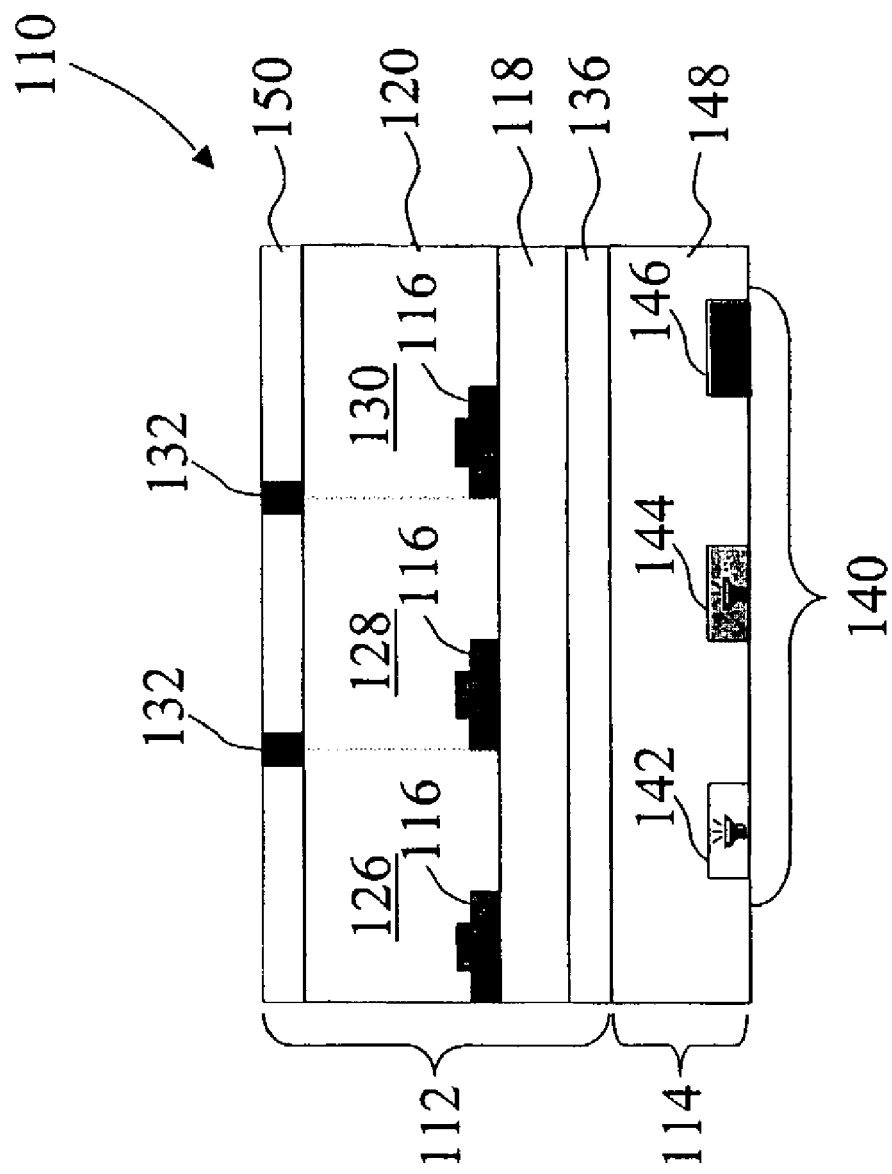
FIG. 2 shows a cross-sectional schematic view of a flat screen display including an LCD coupled with a backlight of light emitting diodes of three component colors, in which each LCD gray scale pixel modulates light output from a light emitting diode of a selected color.

With reference to FIG. 2, a flat screen display 110 includes an active matrix liquid crystal display (LCD) 112 and a backlight 114. The LCD 112 includes a matrix of thin-film transistors (TFTs) 116 fabricated on a substrate 118 of glass or another transparent material. In a suitable embodiment, the TFTs 116 are polysilicon or amorphous silicon transistors. A liquid crystal film 120 is disposed over the substrate 118 and the TFTs 116. Addressing of the TFTs 116 by gate lines (not shown) deposited on the substrate 118 during TFT fabrication cause selected TFTs 116 to conduct electrical current and charge the liquid crystal film 120 in the vicinity of the selected TFTs 116. Charging of the liquid crystal film 120 alters the opacity of the film, and effects a local change in light transmission of the liquid crystal film 120. Hence, the TFTs 116 define display cells or pixels 126, 128, 130 in the liquid crystal film 120. Typically, the opacity of each pixel is charged to one of several discrete opacity levels to implement an intensity gray scale, and so each pixel 126, 128, 130 is a gray scale pixel. Alternatively, pixel opacity can be controlled in an analog fashion to produce a continuous range of intensities, or in a digital (on/off) fashion in which each pixel 126, 128, 130 either transmits light with limited attenuation or substantially completely blocks light transmission.

Figure 1:
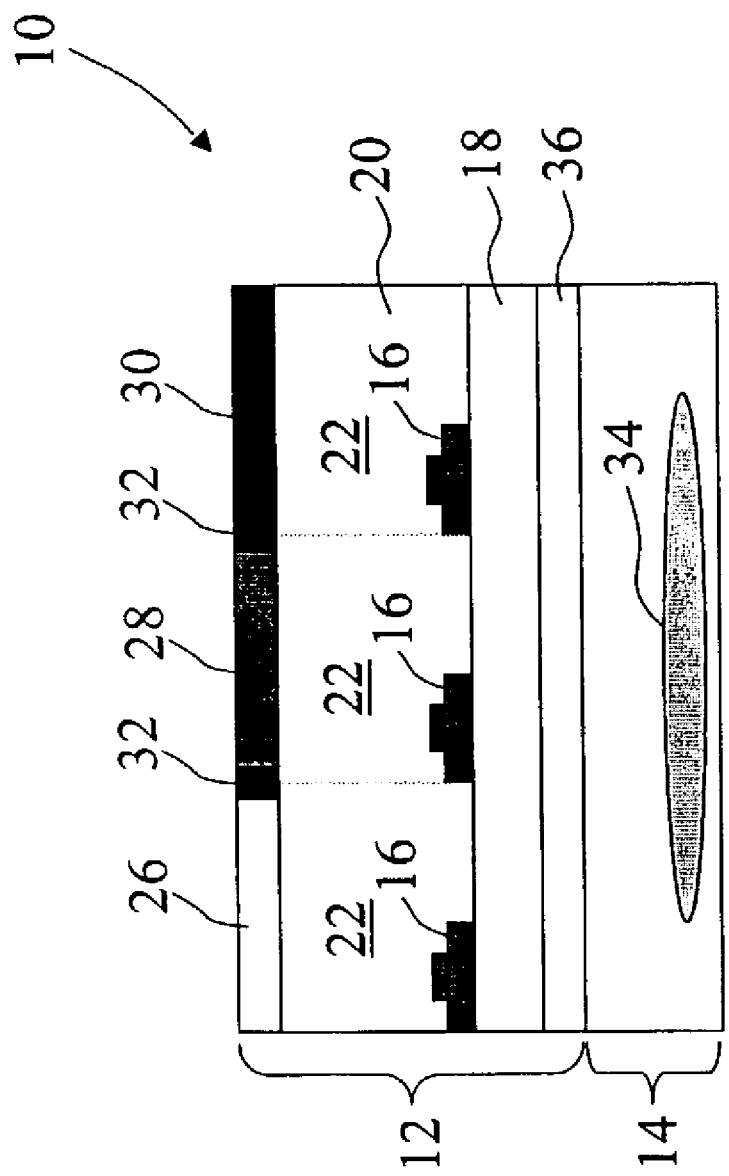
FIG. 1 shows a cross-sectional schematic view of a conventional color flat screen display including a liquid crystal display (LCD) with color filters and a backlight.

Unlike the conventional display 10 of FIG. 1, the flat screen display 110 does not include color filters. Rather it uses the backlight 114 to colorize the display. Specifically, an array of backlight elements 140 each include a first component color light emitting diode (LED) 142, a second component color light emitting diode (LED) 144, and a third component color light emitting diode (LED) 146. For example, in one specific embodiment the first LED 142 emits red light, the second LED 144 emits green light, and the third LED 146 emits blue light, so that each backlight element 140 can emit red, green, or blue light. In this arrangement, the backlight element 140 corresponds to a color pixel. As is known in the art, selective blending of three primary colors such as red, green, and blue can generally produce a full range of colors suitable for color display purposes.

Moreover, each of the three LEDs 142, 144, 146 is optically coupled to a corresponding pixel of the LCD. Specifically, the red LED 142 couples to the pixel 126, the green LED 144 couples to the pixel 128, and the blue LED 146 couples to the pixel 130. Hence, the pixel 126 emits gray scale intensity-modulated red light, the pixel 128 emits gray scale intensity-modulated green light, and the pixel 130 emits gray scale intensity-modulated blue light. Hence, the color filters of the flat screen display 110 are preferably omitted. Optionally, the backlight 114 includes a wave guiding material 148 that improves optical coupling of the LEDs 142, 144, 146 with the respective pixels 126, 128, 130.

In operation, the red, green, and blue LEDs 142, 144, 146 emit light toward the LCD 112. A polarizer 136 of the LCD 112 disposed on a backside of the substrate 118 optimizes the light polarization with respect to polarization properties of the liquid crystal film 120. The opacity of each of the pixels 126, 128, 130 is modulated using the TFTs 116 to create a transmitted light intensity modulation across the area of the display 110. In particular, pixels 126 coupled to the red LEDs 142 modulate the red light component, pixels 128 coupled to the green LEDs 144 modulate the green light component, and pixels 130 coupled to the blue LEDs 146 modulate the blue light component. By selective operation of the pixels 126, 128, 130 for each backlight element 140, a selected color blending is achieved. The combination of gray scale pixels 126, 128, 130 define a full-color or RGB pixel.

Advantageously, the LCD 112 omits light-absorbing color filters of the type 26, 28, 30 used in displays that combine an LCD with a white backlight. That is, the LCD 112 does not include the color filters 26, 28, 30 of the conventional display shown in FIG. 1. This simplifies manufacturing because there are no color filters to precisely align and affix to the LCD. Instead, a large-area cover sheet 750, optionally including a top matrix 732 defined therein, is preferably included with the LCD 112.

Moreover, because color filters are preferably eliminated, the flat screen display 110 exhibits greatly improved light output efficiency compared with the conventional flat screen display 10. Assuming a 50% loss at the polarizer 136, TFT shadow losses of about 15%, and additional small reflection and absorption losses in the liquid crystal film 120 and the cover sheet 150, a light output efficiency of about 22% is typically expected for the display 110. The flat screen display 110 may also beneficially retain the LCD driving electronics of the conventional display 110 in a generally unmodified form, and each LED of the backlight 114 is driven continuously during display operation, further simplifying construction.

However, the display 110 can retain a large color (RGB) pixel area, and manufacture of the display 110 includes alignment of the TFTs 116 with the red, green, and blue LEDs 142, 144, 146. Moreover, depending upon the relative dimensions of the various components, there may be an issue with cross-coupling of LED light between the designated pixels 126, 128, 130. Such cross coupling can cause, for example, blue light to leak into in an image region which is principally red. Optionally, color filters can be included to block cross-coupling and/or to improve spectral quality of the LED light outputs or otherwise alter the LED light output characteristics. In such an arrangement, since component colors pass through filters which are closely spectrally matched to the LED light outputs, light output losses in the filters is minimal.

Figure 3:
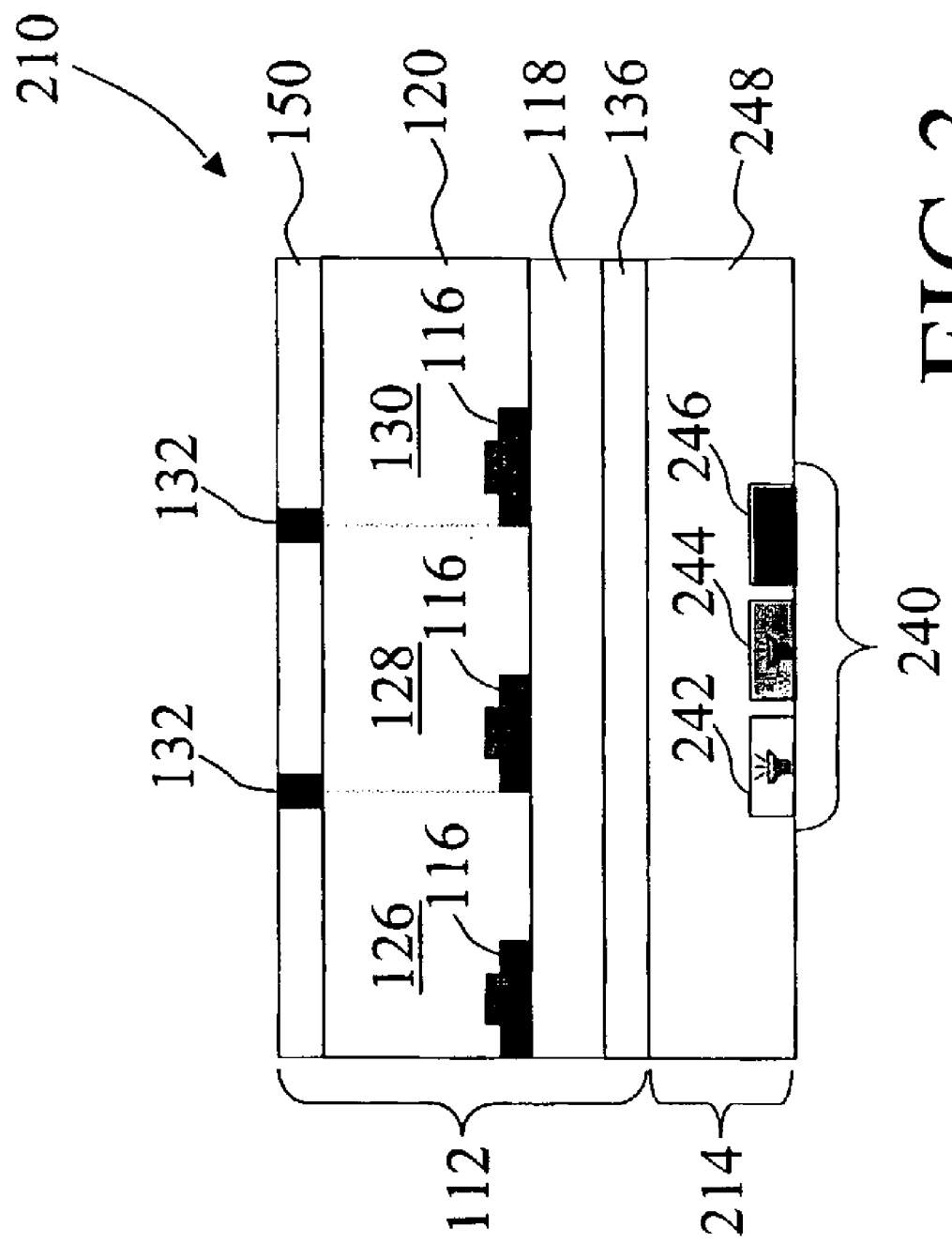
FIG. 3 shows a cross-sectional schematic view of a flat screen display including an LCD coupled with a backlight of light emitting diodes of three component colors, in which each LCD pixel receives light from each of the three component color light emitting diodes in turn.

With reference to FIG. 3, in another display 210 the LCD 112 is coupled with a different backlight 214 to colorize the display. In the backlight 214, an array of backlight elements 240 each include a first component color light emitting diode (LED) 242, a second component color light emitting diode (LED) 244, and a third component color light emitting diode (LED) 246. For example, in one specific embodiment the first LED 242 emits red light, the second LED 244 emits green light, and the third LED 246 emits blue light, so that each backlight element 240 can emit red, green, or blue light.

However, the flat screen display 210 differs from the display 110 in that each LED 242, 244, 246 is not coupled to a single gray scale cell or pixel of the LCD 212. Rather, the LEDs 242, 244, 246 of the backlight element 240 are arranged close together as compared with the LEDs 142, 144, 146 of the backlight element 140 of the display 110, and each of the LEDs 242, 244, 246 couples to all three of the three gray scale pixels 126, 128, 130. Optionally, the backlight 214 includes a wave guiding material 248 that improves optical coupling of the each backlight element 240 with the three pixels 126, 128, 130.

When used in conjunction with the backlight 214 in the display 210, the three gray scale pixels 126, 128, 130 do not cooperate to form a single color or RGB pixel. Rather, each of the gray scale pixels 126, 128, 130 is an independent color or RGB pixel which is capable of transmitting the first, second, or third component colors or any selected combination or blending of these three component colors. Hence, the LCD 112 provides substantially improved resolution when operated with the backlight 214 to define the display 210, as compared with when the LCD 112 is operated with the backlight 114 of the display 110.

Because each gray scale pixel 126, 128, 130 is also a full-color or RGB pixel, it will be recognized that there is no distinction between gray scale pixels 126, 128, 130 and color or RGB pixels in the display 210.

Figure 4:
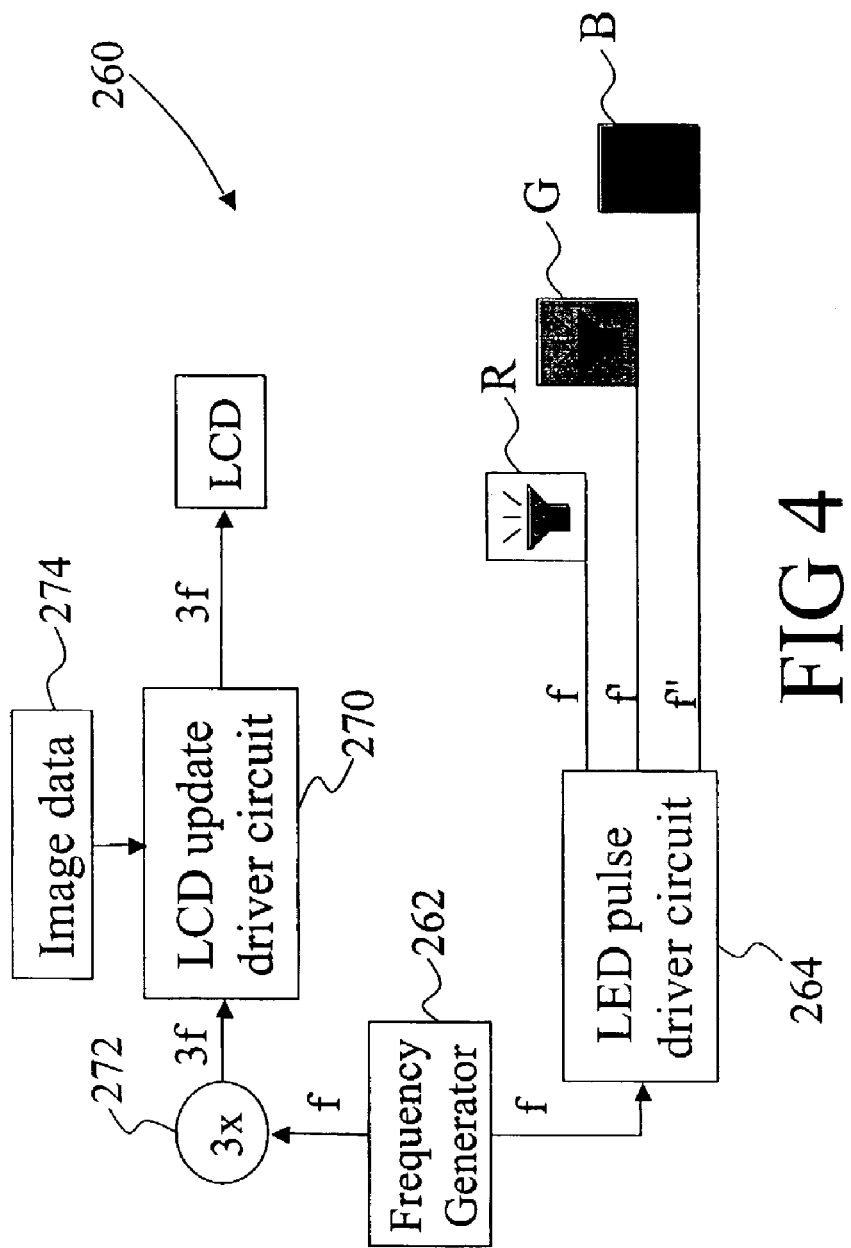
FIG. 4 shows suitable control circuitry for driving the flat screen display of FIGS. 3, 5, and 6.

With continuing reference to FIG. 3 and with further reference to FIG. 4, to achieve color control for each of the pixels 126, 128, 130, the backlight 214 is cycled through the three component colors by control circuitry 260 at a frequency f. In the illustrated embodiment, an oscillator or other frequency generator 262 produces a timing signal at the frequency f which is input to an LED pulse driver circuit 264. The pulse driver circuit 264 successively pulses or energizes each of the LED groups R, G, B of first, second, and third primary colors, respectively, at the frequency f.

At the same time and in a synchronous manner, an LCD update driver circuit 210 receives a synchronous timing signal at a frequency 3 f generated by a frequency multiplier 212, and modulates an LCD at the frequency 3 f such that the LCD has a selected and generally different light transmission pattern during each of the pulsing of the R LED group, the pulsing of the G LED group, and the pulsing of the B LED group. That is, the LCD acts as a selectable gray scale mask through which each of the R, C, and B LED group illuminations successively pass, and the gray scale mask pattern is changed between each of the R, C, and B LED group illuminations.

The frequency f is selected to be substantially higher than a human visual response frequency or visual "refresh" rate. That is, the frequency f is fast enough that the first, second, and third component colors produced during each cycle period 1/f blend together visually to produce a composite color. Hence, by spatially modulating transmission of the first, second, and third component colors through LCD pixel modulation during the cycle period 1/f, the display produces a selected composite color pattern that is visually perceived as a color image by a human viewer. The human eye "refreshes" at less than 50 Hz, and a critical flicker frequency for bright ambient light is typically around 30–35 Hz. Hence, the frequency f is preferably about 60 Hz or higher.

In one specific embodiment, for each cycle period 1/f: (i) first primary color LEDs R (e.g., the LEDs 242 of the backlight 214) are energized for a time period ⅓ f; (ii) second primary color LEDs G (e.g., the LEDs 244 of the backlight 214) are energized for a time period ⅓ f, offset however by a temporal offset ⅓ f to avoid overlap with the first primary color illumination (this frequency is designated f' to indicate the ⅓ f temporal offset); and (iii) third primary color LEDs B (e.g., the LEDs 246 of the backlight 214) are energized for a time period ⅓ f, offset however by a time period ⅔ f to avoid overlap with the second primary color illumination (this frequency is designated f" to indicate the ⅔ f temporal offset). Energizing of the first primary color LEDs R produces a first illumination of the first primary color; energizing of the second primary color LEDs G produces a second illumination of the second primary color; energizing of the third primary color LEDs B produces a third illumination of the third primary color.

During generation of a first illumination produced by the energizing of the LEDs R, the LCD produces a first display through which the first primary color transmits. The first illumination is then extinguished, the LCD is updated, and the second illumination is produced by energizing the second LEDs C, which transmits through the updated LCD display. The second illumination is then extinguished, the LCD is again updated, and the third illumination is produced by energizing the third LEDs G, which transmits through the updated LCD display. The first, second, and third illuminations are repetitively cycled at the frequency f whose period is less than a response time of a human eye, to produce selected individual color blending for each pixel as selected by the LCD update driver circuit 270 based on image data 274 to display a selected image.

Those skilled in the art can readily modify the above-described synchronous timing sequence for specific situations. For example, generally any ordering of the first, second, and third illuminations can be employed. Moreover, the first, second, and third illumination times need not be equal. For instance, in an RGB display the green illumination time can be extended relative to the red and blue times to account for lower human visual sensitivity to the green component. Furthermore, brightness differences between the first, second, and third LED groups R, C, B can be corrected by adjusting the corresponding illumination times.

In yet another variation, additional colors can be added to the display to provide improved color rendering. For instance, white LED component can be added to red, green, and blue components of the backlight element 240 to provide improved white coloration. In this case, the frequency multiplier 272 should produce an output at 4 f to provide independent LCD modulation for the R, C, B, and white components. Indeed, instead of the red, green, and blue primary colors, any combination of color components which is combinable to provide the desired color rendering range can be used. For example, four, five, six, or more LED types that produce four, five, six, or more color components can be used to provide highly accurate blended color rendering. It will particularly be appreciated that such improved color rendering using a four or more color components, using extended green illumination time, or the like are achieved without increasing the color pixel size.

With continuing reference to FIGS. 3 and 4, in operation the red, green, and blue LEDs 242, 244, 246 produce red, green, and blue illumination cycled at a frequency f using the control circuitry 260. The illumination is directed toward the LCD 112. The polarizer 136 of the LCD 112 disposed on a backside of the substrate 118 optimizes the light polarization with respect to polarization properties of the liquid crystal film 120. The opacity of the pixels 126, 128, 130 are independently modulated for each of the red, green, and blue illuminations using the TFTs 116 to selectively blend the red, green, and blue component colors to produce a selected color blending at each of the pixels 126, 128, 130. Since for each cycle period 1/f there are three different illuminations (red, green, and blue), the LCD 112 is modulated at a frequency 3 f by the LCD update driver circuit 270.

The LCD 112 used in the display 210 retains the high light output efficiency of about 22% it exhibits in the display 110.

Alignment of the backlight 214 with the LCD 112 to form the display 210 is substantially relaxed compared with alignment of the backlight 114 with the LCD 112 to form the display 110. Each backlight element 240 is generally aligned with the three pixels 126, 128, 130. Cross-coupling of light between the pixels 126, 128, 130 is substantially less problematic in the display 210 because only a single color component is being generated at any given time. Cross-coupling in the display 210 can produce blurring at color change boundaries, but does not inject a color component into an extended region which should be substantially devoid of that color component.

In the described operating mode, the display 210 has improved spatial resolution compared with the display 110 because each color or RGB pixel consists of a single one of the gray scale pixels 126, 128, 130. Or, stated conversely, each of the gray scale pixels 126, 128, 130 corresponds to a single full-color pixel.

However, the display 210 can also be operated in a different mode, in which the gray scale pixels 126, 128, 130 are operated together to define a single larger full-color pixel. In this operating mode, the resolution is the same as that of the display 110 but the light output is greatly increased compared with the display 110. For example, with the display 210a pure red light output transmits only the pixel 126, whereas with the display 210a pure red light output transmits through all three gray scale pixels 126, 128, 130. However, it will be recognized that in this latter operating mode there is electronic redundancy since the three TFTs 116 perform identical tasks. Moreover, cooperative employment of three TFTs 116 unnecessarily increases the shadowing losses.

Figure 5:
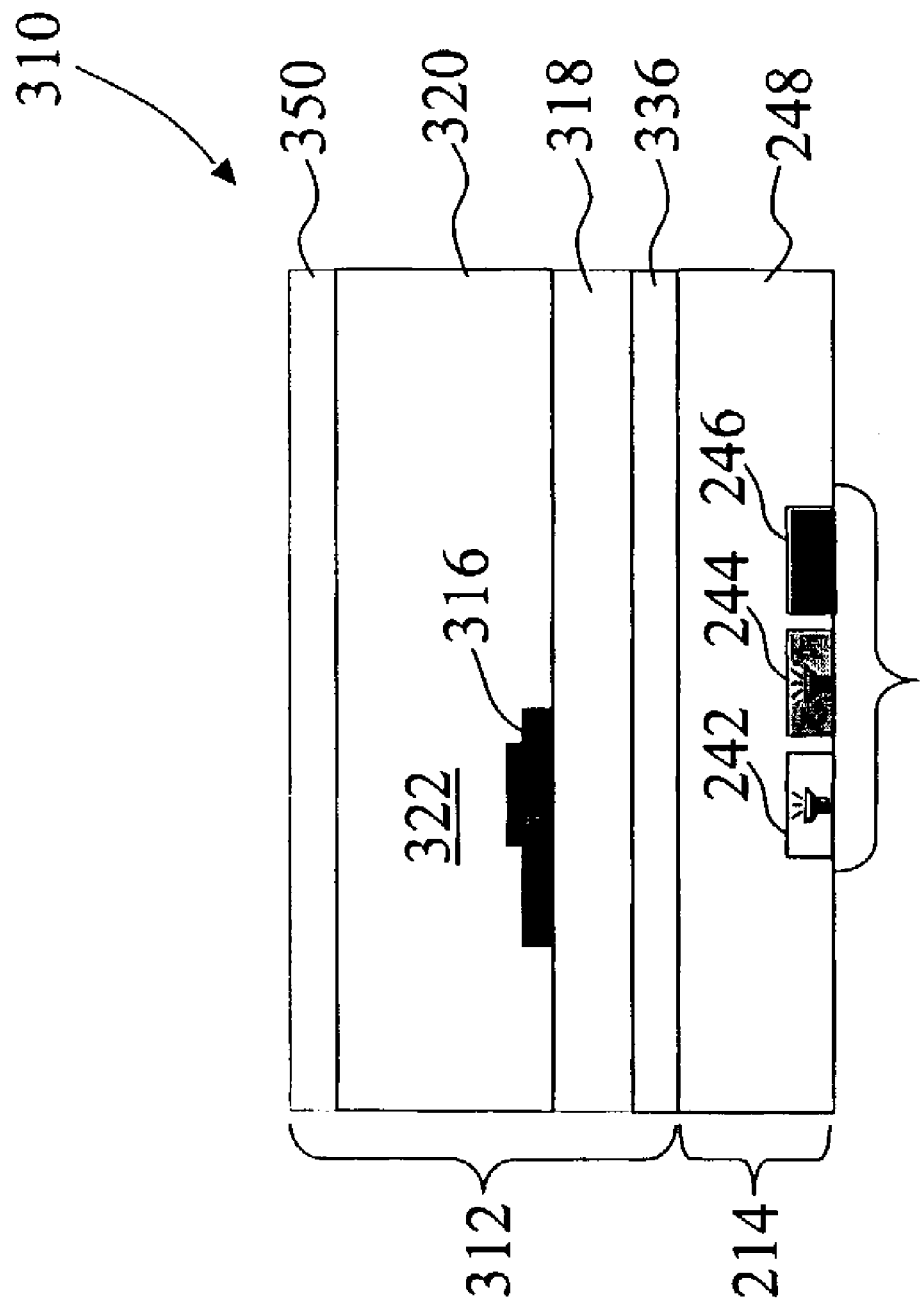
FIG. 5 shows a cross-sectional schematic view of a flat screen display including an LCD coupled with a backlight of light emitting diodes of three component colors, in which each LCD pixel receives light from light emitting diodes of each of the three component colors in turn. The display of FIG. 5 has a lower resolution but higher light output efficiency than the display of FIG. 3.

With reference to FIG. 5, a flat screen display 310 employs the same backlight 214 of the display 210 with the same control circuitry 260 of FIG. 4. However, in the display 310 the backlight 214 is coupled to a slightly modified liquid crystal display (LCD) 312 compared with the LCD 212. The LCD 312 is structurally similar to the LCD 212, and includes analogous components: a transparent substrate 318, thin film transistors (TFTs) 316, a liquid crystal film 320 that cooperates with the TFTs 316 to define pixels 322, a polarizer 336 disposed on a backside of the substrate 318, and a cover sheet 350.

However, the LCD 312 of the display 310 includes only a single full-color pixel 322 coupled with each backlight element 240. This arrangement reduces the TFT shadowing losses to improve the light output efficiency. The three pixels 126, 128, 130 in a linear direction of the LCD 212 are reduced to a single pixel 322 in the LCD 312, and so the number of TFTs in a given area is substantially reduced. However, each TFT 316 operates to charge an area substantially larger than the area charged by each TFT 216, and so the TFT 316 is typically a larger device. Accounting for both TFT size and density, the display 310 is expected to have an improved light output efficiency of about 27% due to the reduced TFT shadowing losses.

In both flat screen displays 210, 310 there is a selected coupling between defined backlight elements 240 and selected corresponding pixels. In the display 210, each backlight element 240 has three pixels 126, 128, 130 optically coupled therewith. In the display 310, each backlight element 240 has a single pixel 322 coupled therewith. However, as discussed next, it will be appreciated that particularized coupling of first, second, and third (or more) primary or component color LEDs with each pixel is optional.

Figure 6:
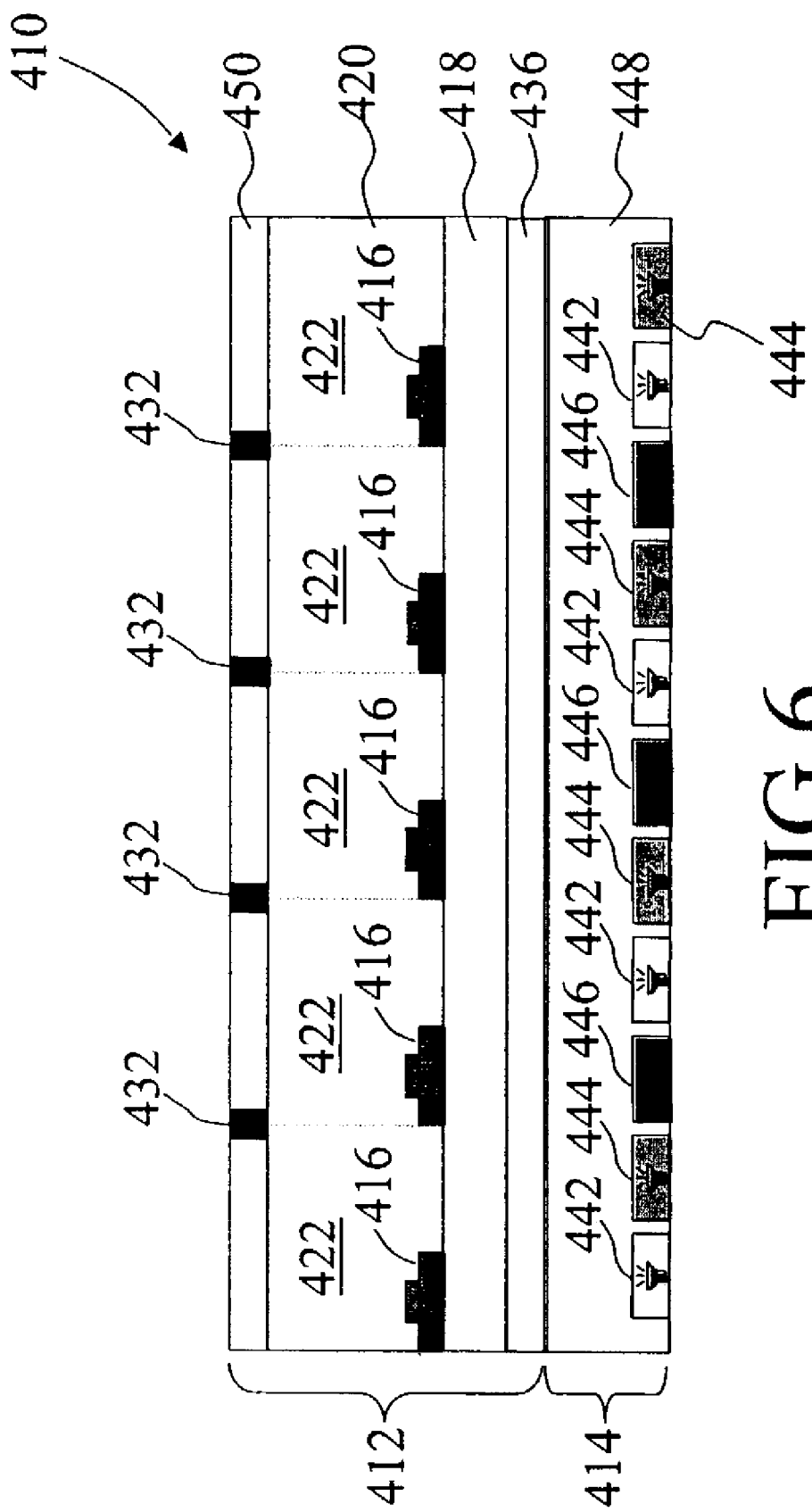
FIG. 6 shows a cross-sectional schematic view of a flat screen display including an LCD coupled with a backlight that produces generally planar illumination directed toward the LCD. The generally planar illumination cycles through three color components in succession.

With reference to FIG. 6, a flat screen display 410 includes a liquid crystal display (LCD) 412 which is substantially similar to the LCD 212 of the display 210. In particular, the LCD 412 includes analogous components: a transparent substrate 418, thin film transistors (TFTs) 416, a liquid crystal film 420 that cooperates with the TFTs 416 to define pixels 422, a polarizer 436 disposed on a backside of the substrate 418, and a cover sheet 450.

A backlight 414 of the flat screen display 410 is similar to the backlight 214 in that the backlight 414 includes analogous first color component LEDs 442, second color component LEDs 444, and third color component LEDs 446. However, unlike the backlight 214 of the displays 210, 310, the backlight 414 does not have the LEDs 442, 444, 446 grouped into backlight elements. Rather, the first component color LEDs 442 are distributed substantially uniformly over the display area. The second component color LEDs 444 are interspersed among the first component color LEDs 442 and are also distributed substantially uniformly over the display area. The third component color LEDs 446 are interspersed among the first component color LEDs 442 and among the second component color LEDs 444, and are also distributed substantially uniformly over the display area.

There is no particular correspondence or coupling between particular LEDs 442, 444, 446 and the pixels 422. Rather, the spatially distributed first color LEDs 442 produce a generally planar illumination of the first color generally directed toward the LCD 412. Similarly, the spatially distributed second color LEDs 444 produce a generally planar illumination of the second color generally directed toward the LCD 412, and the spatially distributed third color LEDs 446 produce a generally planar illumination of the third color generally directed toward the LCD 412. Optionally, the backlight 414 includes a wave guiding material 448 that improves optical coupling of the first component color LEDs 442, the second component color LEDs 444, and the third component color LEDs 446 with the LCD 412. The LCD 414 and the backlight 412 are suitably operated by the control circuitry 260 at the frequency f as described previously with reference to the display 210.

In operation, the flat screen display 410 should generate each of the first component color illumination, the second component color illumination, and the third component color illumination in a substantially uniform spatial distribution across the display area to define a substantially uniform planar illumination that impinges upon the liquid crystal film 420. To improve planar illumination uniformity, a high density of closely packed, relatively small LEDs can be employed. Moreover, thick wave guiding material 448 advantageously provides for substantial spreading of the LED light outputs for improved planar illumination uniformity. Optionally, the wave guiding material 448 includes light scattering centers such as reflective suspended particulates to scatter and distribute the LED light.

The backlight 412 produces planar illumination of selected component colors, such as the primary colors red, green, and blue, under control of the pulse driver circuit 264. It will be appreciated that the distributed discrete LEDs 442, 444, 446 can be replaced by other types of lamps or planar light sources. For example, red, green, and blue compact fluorescent lamps (CFLs) can be employed. Preferably the red, green, and blue CFLs are intertwined to provide overlapping illumination, and are preferably coupled to a wave guide to improve planar illumination uniformity across the display area. Additionally, the CFLs should use phosphorescent materials that have very rapid light decay times, so that each CFL can be cycled on and off at the frequency f. Similarly, incandescent color backlights can be employed with a wave guide that effects substantial light mixing. In an incandescent backlight embodiment, the incandescent filaments should each have a low thermal mass to promote rapid light cycling at the frequency f.

Moreover, the LEDs of the backlights 112, 212, 312, 412 can be semiconductor devices, organic light emitting diodes, semiconductor lasers, or other types of lamps or light emitting devices. For the cycled backlights 212, 412 the various color component LEDs need not be identical or even similar, since variations in the light output intensity between the component colors can be corrected by varying the duration of each component color illumination in the sequence of the backlight cycling. For example, if high-power phosphide-based red LEDs are combined with lower power nitride-based blue LEDs, the blue illumination duration is suitably increased relative to the red illumination duration to correct for the intensity difference. Moreover, substantial differences in component color illumination intensity can also be corrected by increasing the number of LEDs of the lower illumination type in each backlight element. For example, each backlight element can include one red LED, one blue LED, and two green LEDs to adjust for reduced visual sensitivity to green. In the backlight 412, an analogous modification is to increase the density of LEDs of the lower illumination type relative to the density of LEDs of the higher illumination type.

Preferably, in each of the described embodiments, the LCD should transmit light with substantially no change in color properties of the light. That is, the LCD opacity for a given stored electrical charge is preferably substantially similar for the first, second, and third (or more) component colors. However, it will be recognized that relative differences in LCD opacity for the component colors is functionally equivalent to variations in the relative illumination intensity of the backlight color components. Hence, such absorption non-uniformities can be corrected, for example, by adjusting the relative color duty cycles for illumination cycling, or by increasing a number or relative density of LEDs corresponding to colors that are preferentially absorbed.

Moreover, although active matrix LCD components have been described herein, those skilled in the art will appreciate that passive matrix LCDs or other light-transmissive backlit displays can also be used in place of the active matrix LCDs 112, 312, 412. In general, any display which effects a selectable gray scale mask can be employed.

When using either of the cycled backlights 214, 414, each gray scale pixel of the corresponding LCD selectively transmits the first, second, and third component colors to generate substantially any selected component or blended composite color. That is, each pixel of the LCD operates as a full-color pixel. However, those skilled in the art will recognize that this in no way prohibits or limits optional cooperative color blending between neighboring full-color pixels to achieve various types of spatial dithering effects which are well-known in the color display arts. Such dithering is known to provide smooth color transitions, better color rendering, and other beneficial effects. Dithering is suitably incorporated into the image input data 274 received by the control circuitry 260 using known methods.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A color display device including:

a light-transmissive liquid crystal display (LCD);

a backlight arranged to illuminate the light-transmissive LCD, the backlight including at least first color component light emitting diodes (first color component LEDs), second color component light emitting diodes (second color component LEDs), third color component light emitting diodes (third color component LEDs), and white color component light emitting diodes (white LEDs);

LED circuitry that cyclically alternates between powering the first color component LEDs to produce first color component backlighting, powering the second color component LEDs to produce second color component backlighting, powering the third color component LEDs to produce third color component backlighting, and powering the white LEDS to produce white light; and LCD circuitry that updates a display shown on the LCD, the updates being synchronized with color changes of the backlight.

2. The color display device as set forth in claim 1, wherein the LCD is an active matrix LCD with light-transmissive pixels that pass light with substantially no change in color properties of the light.

3. The color display device as set forth in claim 1, wherein the first, second, and third color component LEDs emit primary colors.

4. The color display as set forth in claim 1, wherein the LCD circuitry includes liquid crystal control elements including thin film transistors.

5. The color display as set forth in claim 1, wherein the LED circuitry cyclically alternates the backlight with a cycle period that is less than a response time of a human eye.

6. The color display device as set forth in claim 1, wherein the first, second, and third color component LEDs and the white LEDs are arranged as an array of LED pixels, each LED pixel including a first color component LED, a second color component LED, a third color component LED, and a white LED, the LED pixels corresponding to pixels of the light-transmissive LCD.

7. The color display device as set forth in claim 1, wherein each LED of the backlight corresponds with a pixel of the light-transmissive LCD.

* * * * *